United States Patent
Yan

(10) Patent No.: US 8,160,612 B2
(45) Date of Patent: *Apr. 17, 2012

(54) EXTENDED TRIGGERED POSITION METHOD AND DEVICE

(75) Inventor: Xiaolu Yan, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/157,552

(22) Filed: Jun. 10, 2011

(65) Prior Publication Data

US 2011/0244886 A1 Oct. 6, 2011

Related U.S. Application Data

(63) Continuation of application No. 12/234,535, filed on Sep. 19, 2008, now Pat. No. 8,000,722, which is a continuation of application No. PCT/CN2007/000875, filed on Mar. 19, 2007.

(30) Foreign Application Priority Data

Mar. 20, 2006 (CN) .......................... 2006 1 0065534

(51) Int. Cl.
*H04W 24/00* (2009.01)
(52) U.S. Cl. .................. 455/456.1; 455/456.2; 455/433; 455/435.1
(58) Field of Classification Search ................ 455/456.1, 455/456.2, 456.3, 456.4, 456.5, 404.1, 404.2, 455/412.1, 412.2, 414.1, 414.2
See application file for complete search history.

(56) References Cited

U.S. PATENT DOCUMENTS

| | | | |
|---|---|---|---|
| 6,163,701 | A | 12/2000 | Saleh et al. |
| 6,456,852 | B2 | 9/2002 | Bar et al. |
| 6,519,463 | B2 | 2/2003 | Tendler |
| 6,823,260 | B1 | 11/2004 | Turcotte |
| 6,999,779 | B1 | 2/2006 | Hashimoto |
| 2004/0192337 | A1* | 9/2004 | Hines et al. ............... 455/456.1 |
| 2004/0203863 | A1 | 10/2004 | Huomo |
| 2004/0253964 | A1 | 12/2004 | Zhu |

(Continued)

FOREIGN PATENT DOCUMENTS

CN 1394454 A 1/2003

(Continued)

OTHER PUBLICATIONS

U.S. Appl. No. 12/234,535.

(Continued)

*Primary Examiner* — Jean Gelin
(74) *Attorney, Agent, or Firm* — Leydig, Voit & Mayer, Ltd.

(57) ABSTRACT

An extended triggered location method and device is provided. The device includes the following: a location calculating unit to calculate location of the target terminal and determine the location information, and a third party location reporting unit to send the location information of the target terminal to the third party terminal periodically or only when the area triggered condition is sufficed. With the present invention, the third party terminal can obtain the location information of the target terminal periodically or receive the notice of the target terminal's entry into/exit from a target area, in accordance with the principles of periodical location or area trigger location. Thereby, the invention supplies new location service application and satisfies the subscriber's demand for different location service applications.

13 Claims, 7 Drawing Sheets

U.S. PATENT DOCUMENTS

| | | |
|---|---|---|
| 2005/0200479 A1 | 9/2005 | James |
| 2005/0250516 A1* | 11/2005 | Shim .......................... 455/456.1 |
| 2006/0030334 A1 | 2/2006 | Hashimoto |
| 2006/0245406 A1* | 11/2006 | Shim ............................. 370/338 |
| 2006/0246919 A1* | 11/2006 | Park et al. ................. 455/456.1 |
| 2006/0259240 A1 | 11/2006 | Hashimoto |
| 2007/0004429 A1* | 1/2007 | Edge et al. ................ 455/456.1 |
| 2009/0036142 A1* | 2/2009 | Yan ............................ 455/456.1 |

FOREIGN PATENT DOCUMENTS

| | | |
|---|---|---|
| CN | 1432794 A | 7/2003 |
| CN | 1472974 A | 2/2004 |
| CN | 1568075 A | 1/2005 |
| CN | 1582046 A | 2/2005 |
| CN | 1620178 A | 5/2005 |
| CN | 100446625 C | 12/2008 |
| JP | 2003-143634 A | 5/2003 |
| WO | WO 02/085049 A1 | 10/2002 |
| WO | WO 2004/004372 A1 | 1/2004 |
| WO | WO 2004/034721 A1 | 4/2004 |

OTHER PUBLICATIONS

1st Office Action in corresponding Chinese Application No. 200610065534.8 (Apr. 4, 2008).

Written Opinion of the International Searching Authority in corresponding PCT Application No. PCT/CN2007/000875 (Jul. 5, 2007).

"UserPlane Location Protocol," Jun. 27, 2005, Draft Version 1.0, Open Mobile Alliance, San Diego, California.

"3GPP TS 25.331—3rd Generation Partnership Project; Technical Specification Group Radio Access Network; Radio Resource Control (RRC); Protocol Specification (Release 4)," Dec. 2008, Version 4.20.0, 3rd Generation Partnership Project, Valbonne, France.

"3GPP TS 44.031—3rd Generation Partnership Project; Technical Specification Group GSM/EDGE Radio Access Network; Location Services (LCS); Mobile Station (MS)—Serving Mobile Location Centre (SMLC) Radio Resource LCS Protocol (RRLP) (Release 4)," Jun. 2007, Version 4.14.0, $3^{rd}$ Generation Partnership Project, Valbonne, France.

"3GPP2 C,S0022-0—Position Determination Service Standard for Dual Mode Spread Spectrum Systems," Feb. 16, 2001, Version 3.0, $3^{rd}$ Generation Partnership Project 2 "3GPP2," Arlington, Virginia.

"3GPP2 C.S0022-A—Position Determination Service for cdma2000 Spread Spectrum Systems," Mar. 2004, Version 1.0, $3^{rd}$ Generation Partnership Project 2 "3GPP2," Arlington, Virginia.

$1^{st}$ Information Disclosure Statement in corresponding U.S. Appl. No. 12/234,535 (Sep. 19, 2008).

$2^{nd}$ Information Disclosure Statement in corresponding U.S. Appl. No. 12/234,535 (Jul. 9, 2009).

$3^{rd}$ Information Disclosure Statement in corresponding U.S. Appl. No. 12/234,535 (Apr. 4, 2011).

$1^{st}$ Office Action in corresponding U.S. Appl. No. 12/234,535 (Nov. 23, 2010).

$1^{st}$ Office Action in corresponding European Application No. 07720452.7 (Jan. 23, 2012).

* cited by examiner

EXTENDED TRIGGERED POSITION METHOD AND DEVICE

CROSS-REFERENCE TO RELATED APPLICATIONS

This application is a continuation of U.S. patent application Ser. No. 12/234,535, filed Sep. 19, 2008, which is a continuation of International Application No. PCT/CN2007/000875, filed on Mar. 19, 2007. The International Application claims priority to Chinese Patent Application No. 200610065534.8, filed on Mar. 20, 2006. The aforementioned patent applications are hereby incorporated by reference in their entireties.

FIELD OF THE INVENTION

The present invention relates to the technical field of user plane-based mobile location service, and particularly, to an extended triggered location method and device.

BACKGROUND OF THE INVENTION

Secure User Plane Location (SUPL) is a user plane-based standard protocol, which is a communication protocol allowing a mobile phone user to communicate with a location server, e.g. SUPL Location Platform (SLP), to obtain the location of a mobile location SET.

Generally, immediate SET location includes network-initiated location and SET-initiated location. Specifically, the network-initiated location refers to that a location request initiating party initiates locating for another SET via a client of the initiating party, and the SET-initiated location refers to that a location request initiating party initiates locating for the initiating party itself. The network-initiated location and SET-initiated location procedures, respectively, are described as follows. When the client of the location request initiating party initiates locating for another SET by means of a Mobile Location Service (MLS) application residing in the client, a Home SUPL Location Platform (H-SLP) of the target SET instructs the target SET to start locating, calculates the location of the target SET in the session between the target SET and the H-SLP, and sends the calculation result to the MLS client to complete the location procedure. Accordingly, when a SUPL SET initiates locating for itself, the SUPL SET makes a session with its home H-SLP and obtains its location immediately.

A triggered location procedure is different from the immediate location procedure above. When the MLS application in the client initiates a triggered location procedure for the target SET, a triggered location condition resides in the H-SLP of the target SET or in the target SET, and, when the triggering condition is met, a location session is triggered. If the trigger resides in the H-SLP, a network-initiated location procedure is triggered. If the trigger resides in the target SET, a SET-initiated location procedure is triggered.

Periodical location, a kind of triggered location, triggers locating for the target SET at a certain time interval within a certain period, in order to learn about the location information of the target SET within this period.

Area event triggered location refers to that the network or SET detects periodically whether the target SET is in, entering or leaving a specified area. If the target SET is in, entering or leaving the specified area, it means that the triggering condition is met, and then a location report is triggered.

In some location applications, the target SET may actively initiate a location request for itself. However, besides itself, the target SET may expect other target SETs to obtain its location information. That is to say, in the SUPL location service initiated by such a SET, the location result may require to be sent to other SETs via the location platform.

Conventionally, only in the immediate location procedure, it may be supported that the target SET sends its location information to a third party. In this case, the target SET specifies an identification (ID) of a third party to which the location information of the target SET is to be sent, when the target SET initiates the procedure to transmit its location information to the third party. After the target SET obtains its location by means of the location service, the SLP transmits the location information of the target SET to the third party. A typical procedure initiated by a SET to transmit its location information to a third party is shown in FIG. 1 and described as below.

1. The SUPL agent on the target SET receives a request to transmit the location information of the target SET to a third party from an application running on the target SET. If the target SET is not already attached to the packet data network, the SUPL agent attaches itself to the packet data network, or the target SET establishes a data connection in Circuit Switched domain (CS).

2. The SUPL agent on the target SET establishes an IP connection to the H-SLP by using a default SLP address provided by a home network of the target SET, and then sends a SUPL SET INIT message to the H-SLP to start a location session. The SUPL SET INIT message includes a session-id, SET capabilities, a notified SET-id (ID of the third party), a MO_mode (SET-initiated location request mode) indicator and an ACK mode (acknowledge mode). The MO_mode indicator is designed to identify a SET-initiated location request, i.e. it indicates whether the location request is a location request initiated by the SET to locate another SET or a location request initiated by the SET to transmit its location to a third party. The ACK mode is designed to indicate whether the third party is required to send a receiving acknowledge of the location information.

3. The H-SLP determines that the target SET is not currently in roaming state.

4. The H-SLP sends to the target SET a SUPL RESPONSE message in which the session-id rather than address information of the H-SLP is contained, thus to instruct the target SET that it is not necessary to establish a new connection. The SUPL RESPONSE message may further contain a location method determined by the H-SLP which is consistent with the location method supported by the target SET contained in the SUPL SET INIT message. If the target SET requests for the location method in the SUPL SET INIT message, the H-SLP uses the supported location protocol obtained from the SUPL SET INIT message, e.g. Radio Resource Location Protocol (RRLP), Radio Resource Control (RRC) protocol, or TIA-801 protocol defined by Telecommunications Industry Association of America. If the approximate location of the target SET that meets the requested Quality of Positioning (QoP) can be calculated from the information in the SUPL SET INIT message, the H-SLP proceeds to step 8 directly.

5. Upon receipt of the SUPL RESPONSE message from the H-SLP, the target SET sends a SUPL POS INIT message in which at least the session-id, the SET capabilities and a location ID are contained. The SET capabilities include the supported location method (e.g., SET-Assisted A-GPS, SET-Based A-GPS) and related location protocol (e.g., RRLP, RRC, or TIA-801). The target SET may provide Network Measurement Result (NMR) parameters related to the currently used radio technique. For a Global System for Mobile communication (GSM) network, for example, the parameters include Timing Advance (TA) and Received Level (RXLEV). If the target SET can calculate its location by itself, it may also provide its location information. The target SET may carry parameters for the first SUPL POS message in the SUPL POS INIT message. The target SET may set the requested assistant data parameters in the SUPL POS NIT message.

6. The target SET exchanges some location messages with the H-SLP continuously. The H-SLP calculates an estimated location result according to the received location measurement information (SET-Assisted), or the target SET calculates the estimated location result according to the assistant data provided by the SLP.

7. After the location calculation is completed, the H-SLP sends a SUPL END message to the target SET to notify the target SET that the location session has been completed. The calculated location may be carried in the SUPL END message, according to the used location method and location protocol.

8. The H-SLP transmits the location information to the third party.

In location application services, transmitting the location information to a third party is not only required by the immediate location service, but also by the triggered location service, especially the area event triggered location service.

For example, in the scenario that the mobile phone of User2 is a mobile phone that can initiate an emergency location service and User1 is a guardian of User2, User2 activates an emergency location application in his mobile phone to initiate a periodical self-location, and each time the location is completed successfully, the SLP notifies User1 of the current location of User2. User1 returns a response to the SLP to acknowledge that he/she has received the location result. If User1 does not return any acknowledge, the SLP may attempt to resend the location result. If the SLP fails to send the location result to User1, the SLP preserves the data for a certain period of time to wait for User2 to get the data actively.

In the network-initiated triggered location procedure specified in SUPL, the triggered location result or report about the target SET is obtained by the client that initiates the location. However, it may be necessary for the SLP to send the location result or report to a third party SET in some location service applications, for example, in the scenario as follows.

When pursuing or monitoring a criminal, the police station, as a special client, initiates a triggered location request for locating the criminal to the SLP via a SUPL agent. In each location process, the location result may be sent by the H-SLP directly to the mobile phones of relevant policemen, it is not necessary for the client to send the result to the policemen by group when receiving the result, or for the policemen to locate the criminal by themselves. The policemen may obtain the location of the criminal periodically, or the location of the criminal may be reported to the policemen responsible for the mission when the criminal leaves or enters into a specific area. Upon receipt of the location result, a response should be returned from the mobile phones of the policemen to the H-SLP to acknowledge the receipt of the location result. If no response is received from these mobile phones, the H-SLP may attempt to resend the location result.

In the SET-initiated location procedure for transmitting the location to a third party specified in SUPL, the location procedure is executed only once, then the location result is transmitted to the third party specified by the target SET. However, the protocol currently doesn't support sending the location result periodically to the third party according to a request of the target SET or network or sending the location result to the third party only when a certain area event triggering condition is met.

SUMMARY OF THE INVENTION

The embodiments of the present invention provide a triggered location method, which solves the problem that the location result cannot be sent to a third party periodically, according to a request of the target SET or network or cannot be sent to the third party when a certain area event triggering condition is met, and thereby provide a variety of location result notification mechanisms for triggered location and enrich the applications of location services.

The embodiments of the present invention provide a triggered location device, so as to enable a third party SET to obtain the location information of the target SET periodically in the case of periodical location or area event triggered location, and thereby meet the users' demands for different location service applications.

The embodiments of the present invention provide:

a triggered location device, including:

a location calculating unit, designed to calculate the location of the target SET and obtain the location of the target SET; and a location notifying unit, designed to send the location information of the target SET calculated by the location calculating unit to the third party SET periodically, or send the location information to the third party SET only when certain area event triggering condition is met;

a triggered location method, pre-configuring with the information of the third party SET that requires location notification; the method includes the following step:

sending to the third party the location information periodically or only when the area event triggering condition is met, by the H-SLP, according to the pre-configured information of the third party SET, after the location information of the target SET is obtained in the location stage.

It can be seen from above technical solutions provided in the present invention that in the embodiments of the present invention, the function of transmitting the location information to the third party that is supported in the immediate location procedure is introduced into the triggered location procedure. The third party SET that needs the location notification is pre-configured, and upon the request from the target SET or network, the location information is sent to the third party periodically or only when a certain area event triggering condition is met. In this way, the location platform may ensure that in the case of periodical location, the third party SET can receive the location result notification of the target SET periodically in case of emergency, and in the case of area event triggered location, area event monitoring tasks can be set for different SETs of different persons so that when the area event triggering condition is met, the persons responsible for a monitoring task can receive the triggering notification and the location information of the monitored object. The present invention enriches the applications of location services and can meet the demands of different users in a better way.

DETAILED DESCRIPTION OF THE EMBODIMENTS

Figure 1:
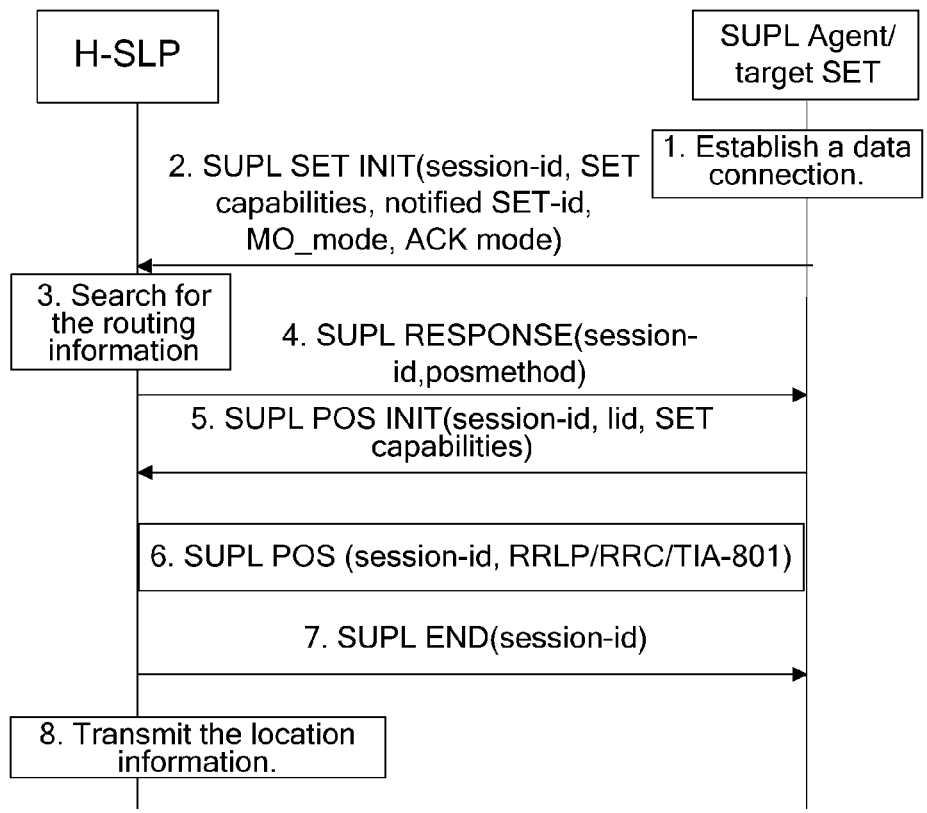
FIG. 1 shows a SET-initiated procedure of transmitting location information to a third party.

In the embodiments of the present invention, a third party SET is introduced into the triggered location procedure, thereby providing a new location result notification mechanism for the triggered location procedure.

In the initial stage of a SET-initiated triggered location procedure, the target SET sends a SUPL SET INIT message to the H-SLP to start a location session with the H-SLP, with the ID of a specified third party SET carried in the message, or the third party SET specified in the private setting of the target SET. In the location stage, after the location information of the target SET is obtained, the H-SLP sends, at the request from the target SET or network, the location information of the target SET to the third party SET periodically or when a certain area event triggering condition is met, according to the third party SET ID specified in the SUPL SET INIT message or the third party SET specified in the private setting of the target SET. After receiving the location information, the third party SET returns an acknowledge message to the H-SLP, to acknowledge the location result notification has been received successfully. After receiving the acknowledge from the third party SET, the H-SLP sends a SUPL REPORT message to the target SET, to notify that the third party SET has received the location information, and then ends the location procedure. When the entire location session is completed, the H-SLP and the target SET release their IP connection, respectively.

In the initial stage of network-initiated trigger location procedure, the H-SLP initializes a location session through an SUPL INIT message, and the ID of the SET to be notified of the location result is specified in the Mobile Location Protocol Triggered Location Reporting Request (MLP TLRR) message sent from the SUPL agent to the H-SLP; if it is specified in the private setting of the target SET that notification and verification are required for the third party, the ID of the third party SET shall be carried in the SUPL INIT message; in the location stage, after the location information of the target SET is obtained, the H-SLP sends the location information to the third party SET periodically or when certain area event triggering condition is met, according to the third party SET ID in the MLP TLRR message. After receiving the location information, the third party SET returns an acknowledge message to the H-SLP, to acknowledge the location result notification has been received successfully. After receiving acknowledge from the third party SET, the H-SLP sends a MLP TLREP message to the SUPL agent. When the entire location session is completed, the H-SLP and the target SET release their IP connection, respectively.

Hereinafter, one embodiment of the triggered location device will be provided, which includes:

a location calculating unit, designed to calculate the location of the target SET, thus obtain the location of the target SET; and a location notifying unit, designed to send the location information of the target SET calculated by the location calculating unit to the third party SET periodically or when certain area event triggering condition is met.

In one embodiment of the triggered location method provided in the present invention, the information of a third party SET that requires the location notification is pre-configured; the method includes:

sending to the third party SET the location information periodically or when the area event triggering condition is met, by the H-SLP, according to the pre-configured information of the third party SET, after the location information of the target SET is obtained in the location stage.

It can be seen from above, the function of transmitting the location information to the third party that is supported in the immediate location procedure is introduced into the triggered location procedure, the third party SET that requires the location notification is pre-configured, and the location information is sent, at the request from the target SET or network, to the third party periodically or when certain area event triggering condition is met. In that way, in the case of periodical location application, the location platform ensures that the third party SET can receive the location result of the target SET periodically in case of emergency; in the case of area event triggered location application, area event monitoring tasks can be set for different SETs of users, so that when the area event triggering condition is met, the person responsible for the monitoring task can receive the triggering notification and the location information of the monitored object. The present invention enriches the application of location services and can meet the demands of different users in a better way.

To make the technical solution of the present invention to be easily understood by those skilled in the art, hereunder the present invention will be further detailed with reference to the embodiments as well as the accompanying drawings.

Figure 2:
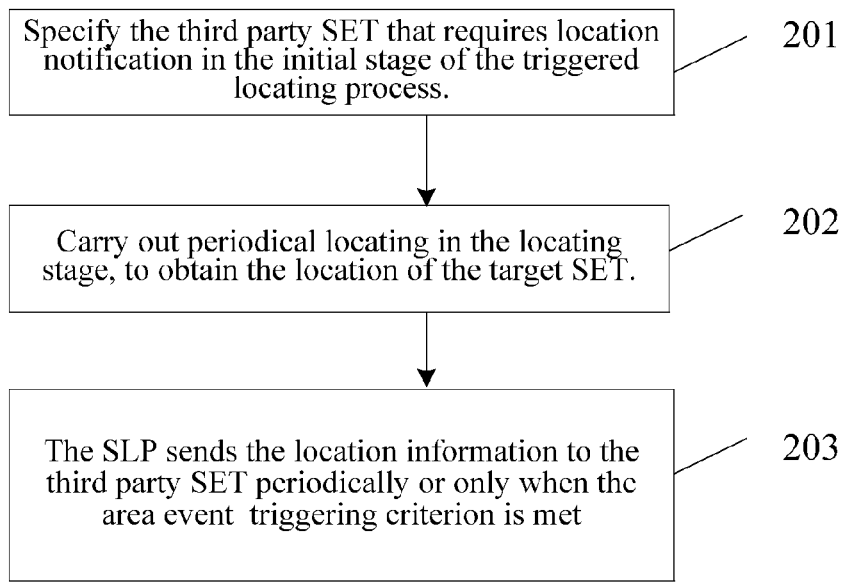
FIG. 2 shows an implementation procedure of a method according to an embodiment of the present invention.

Referring to FIG. 2, it shows the implementation procedure of the triggered location method provided in one embodiment of the present invention, the method includes:

Block 201: In the initial stage of triggered location procedure, the third party SET that requires location notification is specified.

For a SET-initiated triggered location procedure, the MLS application on the target SET initiates a location procedure for itself. If the trigger is at the network side, the H-SLP triggers periodical location; if the trigger is at the SET side, the SET triggers periodical location. In the initial stage in the two cases, the procedure is identical, i.e., the target SET sends a SUPL SET INIT message to the H-SLP, and then the H-SLP returns a SUPL TRIGGERED RESPONSE acknowledge message to the target SET. In this process, some parameters are negotiated, then proceeding to the subsequent location procedure.

Therefore, for a SET-initiated triggered location procedure, the third party SET may be specified in the SUPL SET INIT message sent from the target SET to the H-SLP, that is to say, in the initial stage of the triggered location procedure, the target SET sends to the H-SLP a SUPL SET INIT message in which the ID of the third party SET is carried; or, the third party SET may be specified in the private setting of the target SET, and the setting is stored in a private server or H-SLP of the target SET.

The private setting of the target SET may be set before the location procedure is triggered; the third party SET may be specified in the private setting, or the target SET may also be specified in the private setting whether notification and verification are both required for the location initiating requester and/or the third party SET that requires location notification, and whether notification and verification are performed once in the initial stage or whenever a location session starts, etc. For example, there are the following scenarios:

The private setting is configured as follows: in the initial stage of a location session, the H-SLP judges, according to the private setting of the target SET, whether notification and verification are required for the requester and/or the third party SET ID, and the target SET verifies the requester and/or third party SET ID; if the target SET permits, the location procedure is continued; otherwise the entire location procedure is terminated, or the location or the triggered event is not sent to the third party after the area event is triggered. The private setting may also be used to check the requester requesting for the historical locations of the target SET.

The following private policies are available for the third party and the location initiating requester. The private policies may be combined in use:

(1) no notification and no verification is required;
(2) only notification is required;
(3) both notification and verification are required, and each notification is required to be verified by the target SET; and
(4) both notification and verification are required, and only the first notification is required to be verified by the target SET.

For example, a combined policy may be as follows: both the notification and verification are not required for the location requester, but required for the specified third party ID.

The target SET may further specify in the private setting whether to notify the target SET after the location result is sent to the third party SET.

In the network-initiated triggered location procedure, the SUPL agent at the network side initiates periodical location for the target SET. If the location trigger is at the network side, the H-SLP triggers the periodical location. If the trigger is at the target SET side, the target SET triggers the periodical location. The procedures in the initial stage in the two cases are identical. For example, after the SUPL agent initiates a location request to the H-SLP for the target SET, the H-SLP sends a SUPL INIT (SUPL initialization) message to the target SET, to notify the target SET to start triggered location; the target SET responds with a SUPL TRIGGERED START message, and then the H-SLP for the target SET returns a SUPL TRIGGERED RESPONSE (SUPL triggered response) message to the target SET for acknowledge, and sends a location acknowledge message to the SUPL agent. In that process, some parameters (e.g. location method) are negotiated, then proceeding to the subsequent location procedure.

Therefore, for the network-initiated triggered location, the SUPL agent associated to the H-SLP may send a MLP TLRR message to the H-SLP to initiate a triggered location request, with the third party SET ID specified in the MLP TLRR message; if it is specified in the private setting of the target SET that notification and verification are required for the third party, the third party SET ID specified in the MLP TLRR message is to be carried in the SUPL INIT message that is sent from the H-SLP to the target SET.

Block 202: periodical location is carried out in the location stage to obtain the location of the target SET.

If the trigger is at the SET side, the start time of periodical location is determined according to the triggered location task, and, when the time is reached, the target SET sends to the H-SLP a SUPL POS INIT message in which a session-id, SET capabilities, a location ID and the like are contained. The SET capabilities include the supported location methods and relevant location protocols. Then, the target SET exchanges messages with the H-SLP in the location process. If the trigger is at the network side, the start time of periodical location is determined according to the triggered location task. When the time is reached, the H-SLP sends to the target SET a SUPL TRIGGER message in which the parameters (session-id, location method, etc.) are carried. When receiving the message, the target SET responds to the H-SLP with a SUPL POS INIT message in which the session-id, SET capabilities, location ID and the like are carried.

Those skilled in the art know that, a variety of location methods are available, such as A-GPS SET Assisted method, A-GPS SET Based method, Cell ID based location method, and other location methods that are supported by network and SET.

The H-SLP and the target SET may use any of above location methods to obtain the location of the target SET; other location methods are also permitted.

Block 203: The H-SLP sends the location information to the third party SET periodically or when the area event triggering condition is met.

It is determined whether the location of the target SET is to be sent to the third party terminal in each periodic location, and whether the verification from the target SET is required when the location of the target SET is to be sent, according to the third party SET ID obtained in Block 201 and the private setting of the target SET.

If the verification from the target SET is required, the H-SLP sends a message carrying the parameter of notification and verification to the target SET, before sending the location information of the target SET obtained in present locating to the third party SET. The H-SLP does not send the location information to the third party SET before it receives the verification from the target SET. If no verification from the target SET is required, the H-SLP sends the location information directly to the third party SET when obtaining the location of the target SET.

During the sending of the location notification, the H-SLP sends to the third party SET a SUPL NOTIFY message in which the ID of the target SET and the location information of the target SET and/or the information indicating the target SET meets the area event triggering condition is carried. When receiving the SUPL NOTIFY message, the third party SET returns a SUPL NOTIFY ACK (acknowledge notification from the third party SET) message to the H-SLP.

In a SET-initiated triggered location process, after the H-SLP receives the SUPL NOTIFY ACK message, if the private setting in the target SET specifies a report of the notification result is needed, the H-SLP sends a SUPL REPORT message to the target SET to notify that the third party SET has received the location information and then ends the location process. In a network-initiated triggered location process, after the H-SLP receives the acknowledge notification from the third party SET, the H-SLP sends a MLP TLREP message to the SUPL agent to notify the SUPL agent that the third party SET has received the location message. If the private setting in the target SET specifies a report of the notification result is needed, the H-SLP sends a SUPL REPORT message to the target SET to notify that the third party SET has received the location information and then ends the location process.

The SUPL NOTIFY message may be carried via a SMS or WAP PUSH (a wireless access protocol push message) or over the IP network, for example, it may be sent to the third party SET via an instant messaging (IM) or EMAIL server.

If the H-SLP doesn't receive the SUPL NOTIFY ACK message from the third party SET within a predefined time period, the H-SLP may resend the SUPL NOTIFY message to the third party SET for predefined times. If the H-SLP still cannot receive the acknowledge notification from the third party SET after having sent the location notification message to the third party SET for the predefined times, the H-SLP preserves the location information of the target SET obtained in present locating locally or in the target SET. The preservation time and data capacity for the location information stored in the H-SLP or the target SET are predefined by the target SET.

In that way, when another SET or SUPL agent requests the H-SLP for the historical location information of the target SET, the H-SLP determines whether it is allowed to provide the historical location information to the another SET according to the private setting in the target SET. If allowed, the H-SLP sends the historical location information of the target SET stored locally or in the target SET to another SET.

If a plurality of third party SETs require for location notification, the H-SLP sends the location notification message to each of the third party SETs in sequence.

Due to mobility of the target SET, when the target SET is in roaming state, the area event triggered location procedure is accomplished jointly by the H-SLP and Visit SUPL Location Platform (V-SLP) for the target SET. In a network initiated location process, the SUPL agent initiates a location request to the Request SUPL Location Platform (R-SLP); the R-SLP ascertains the H-SLP for the target SET; the H-SLP checks whether the target SET is in a roaming state; if the target SET is in a roaming state, the H-SLP notifies the corresponding V-SLP, and the parameters (e.g., location method) are determined by means of session negotiation among the V-SLP, H-SLP, and the target SET; the party where the trigger resides checks the current location of the target SET periodically, and returns a triggered location report to the SUPL agent at the end of each locating or whenever the area event triggering condition is met, and then the H-SLP sends the location information to the third party SET. The entire location procedure terminates at the end of the location period or when the area event triggering condition is met. In a SET-initiated location process, the SET initiates a location request to the H-SLP; the H-SLP searches for the routing information; if the H-SLP finds the SET is in a roaming state, it notifies the corresponding V-SLP, and the parameters (e.g., location method) are determined by means of session negotiation among the V-SLP, H-SLP, and target SET; the party where the trigger resides checks the current location of the target SET periodically, and return a triggered location report to the SUPL agent at the end of each locating or whenever the area event triggering condition is met; then, the H-SLP sends the location information to the third party SET. The entire location procedure will terminate at the end of the location period or when the area event triggering condition is met.

In order to enable those skilled in the art to understand the difference between the embodiments of the present invention and the triggered location procedure in the existing systems, hereunder the embodiments of the present invention in different modes will be described in comparison with the triggered location procedure in the prior art.

For a triggered location process, whether to start a periodical location procedure is judged according to the triggering condition. In a periodical location process, the location of the target SET is obtained periodically, and finally the result is transmitted to the location initiator. In an area event triggered location process, when the predefined start time is reached, the periodical location starts, and the location result of each locating is compared with the predefined location; if the condition for entering, leaving, or being in the target area is met, a location report is triggered to report to the location initiator that a triggering event occurs.

Figure 3:
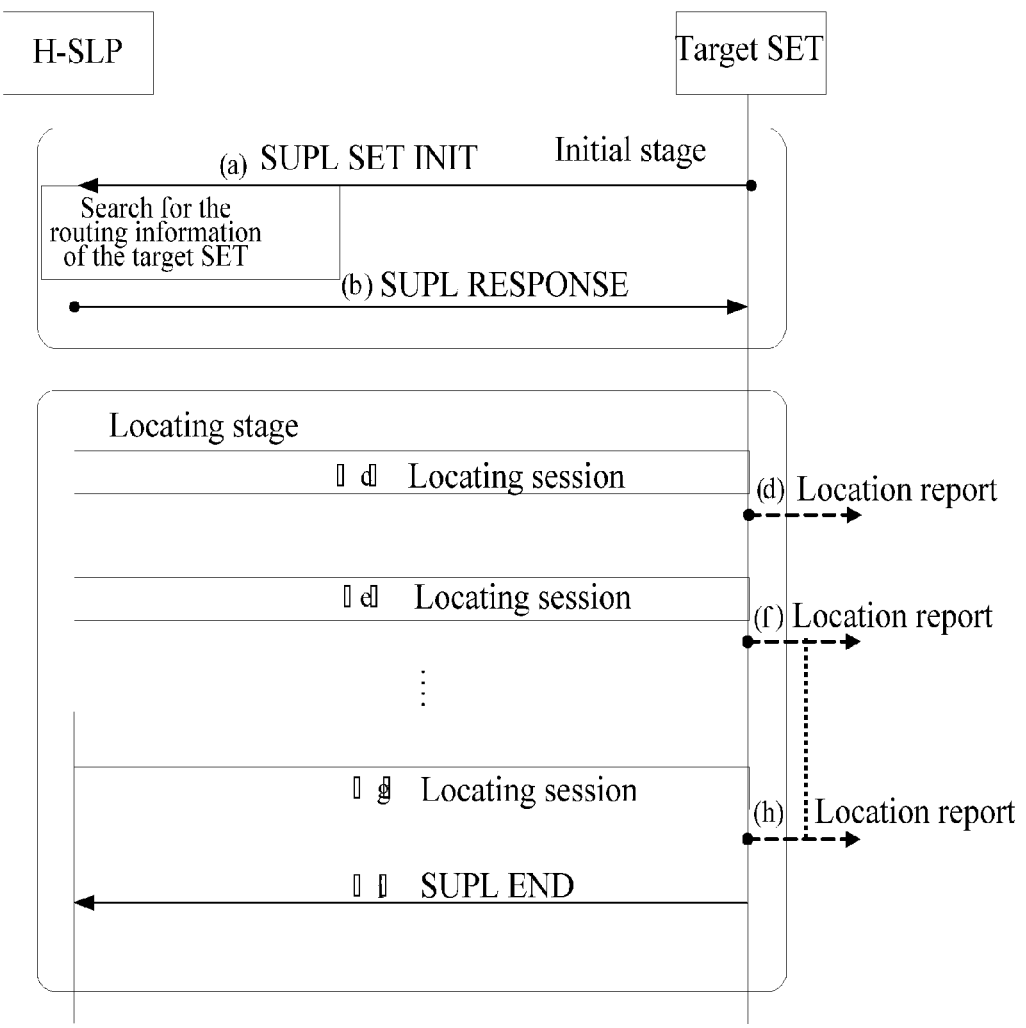
FIG. 3 shows a SET-initiated triggered location procedure.

A SET-initiated triggered location procedure in the existing systems is shown in FIG. 3, in which, in an area event triggered location process, steps d, f, and h are executed only when the area event trigger condition is met; after those steps are executed, the flow will jump to the last step i, and the entire location procedure will be terminated.

Figure 4:
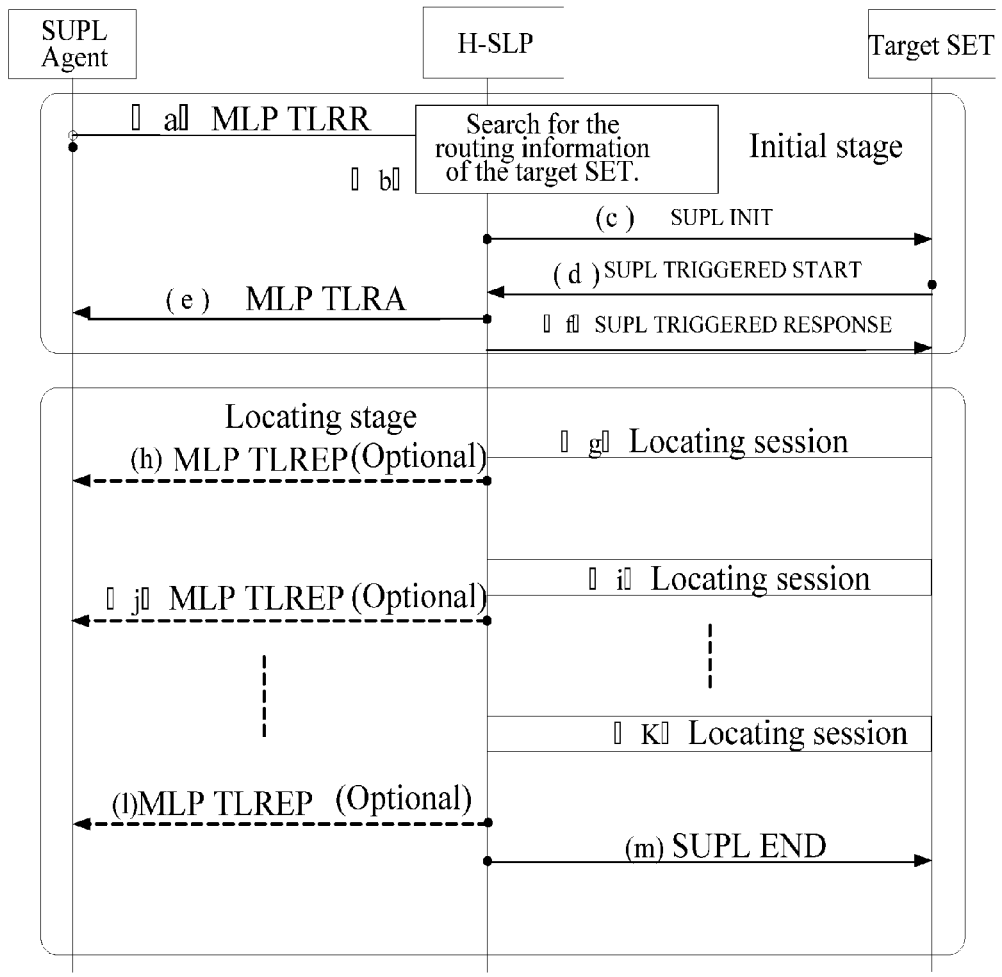
FIG. 4 shows a network-initiated triggered location procedure.

A network-initiated triggered location procedure in the existing systems is shown in FIG. 4, in which, in an area event triggered location process, steps h, j, and l are executed only when the area event trigger condition is met; after those steps are executed, the flow will jump to the last step m, and the entire location procedure will be terminated.

Both a network-initiate triggered location procedure and a SET-initiated triggered location procedure include an initial stage and a location session stage. The difference between the case in which the trigger is at the network side and the case in which the trigger is at the SET side lies in the flow of the location session.

An area event triggered location procedure with the trigger at the SET side is: after the target SET receives an area event triggered location request from the location application client, it stores the area event triggering condition locally. If it is a network-initiated location procedure, the target SET will be notified of the triggered location task. The target SET initiates a location request periodically to the H-SLP according to the condition set for the trigger, obtains the accurate location result by means of interacting with the H-SLP, and compare the location result with the locally stored target area and triggering type (entering, leaving, or staying in the area); if the triggering condition is met, the target SET reports an area event triggered location report to the location application client via the H-SLP or reports an area event triggered location report to the location application inside.

Figure 5:
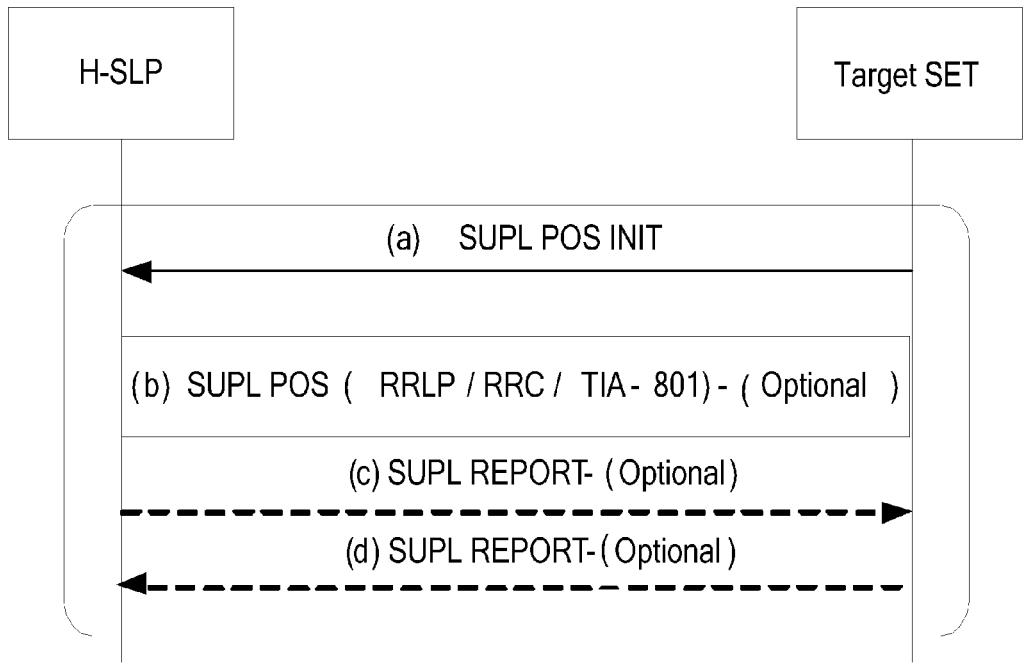
FIG. 5 shows a location session procedure in which a trigger is at the SET side.

FIG. 5 shows a location session flow, with the trigger at the SET side.

Whenever the predefined start time is reached, the SET initiates a location session with the SLP, in either of the following two cases.

1. For a network-initiated location request, if a SET-based location calculation method is used and the assistant data doesn't have to be updated, the target SET sends a SUPL REPORT message to the H-SLP after it completes the calculation in the location session, to notify the H-SLP of the termination of the location process; the previous steps are optional. If a SET-assisted location calculation method is used, the H-SLP calculates the location result and then reports the location result to the target SET in a SUPL REPORT message. The target SET judges whether the area event triggering condition is met. If the condition is met, the target SET notifies the H-SLP in a SUPL REPORT message that an area event has been triggered.

2. For a SET-initiated location request, if a SET-based location calculation method is used and the assistant data doesn't have to be updated, the target SET sends a SUPL REPORT message to the H-SLP after it completes the calculation in the location session, to notify the H-SLP of the termination of the location process; the previous steps are optional. If a SET-assisted location calculation method is used, the H-SLP calculates the location result and then reports the location result to the target SET in a SUPL REPORT message. The target SET judges whether the area event triggering condition is met. If the condition is met, the target SET notifies the application inside.

An area event triggered location procedure with the trigger at the network side is as follows: after the H-SLP receives an area event triggered location request from the location application client or target SET, it stores the area event triggering condition locally, and starts periodical location according to the predefined start time of triggering in the H-SLP. The H-SLP initiates an immediate location procedure periodically to the target SET, and, whenever the accurate location of the target SET is obtained, compares the location with the target area and the area event triggering type (entering, leaving, or staying in the area) specified in the triggered location task; if the triggering condition is met, the H-SLP reports an area event triggered location report to the location initiator.

Figure 6:
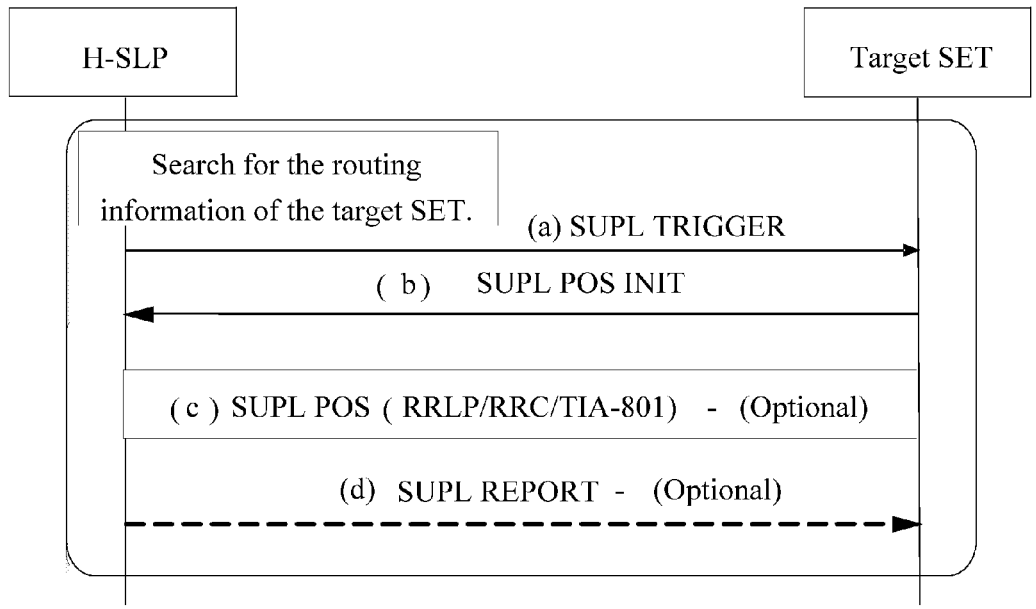
FIG. 6 shows a location session procedure in which a trigger is at the network side.

FIG. 6 shows a location session procedure, with the trigger at the network side.

Whenever the predefined start time is reached, the H-SLP initiates a location session with the SET, in either of the following two cases:

1. For a network-initiated location request, if a SET-based location calculation method is used and the assistant data doesn't have to be updated, the target SET sends a SUPL REPORT message to the H-SLP after it completes the calculation in the location session, to notify the H-SLP of the termination of the location process; the previous steps are optional. If a SET-assisted location calculation method is used, the H-SLP judges whether the area event triggering condition is met. If the condition is met, the H-SLP notifies the SUPL agent for the location application client.

2. For a SET-initiated location request, if a SET-based location calculation method is used and the assistant data doesn't have to be updated, the target SET sends a SUPL REPORT message to the H-SLP after it completes the calculation in the location session, to notify the H-SLP of the termination of the location process; the previous steps are optional. If a SET-assisted location calculation method is used, the H-SLP calculates the location result and then judges whether the area event triggering condition is met. If the condition is met, the H-SLP notifies the SUPL agent for the location application client.

Figure 7:
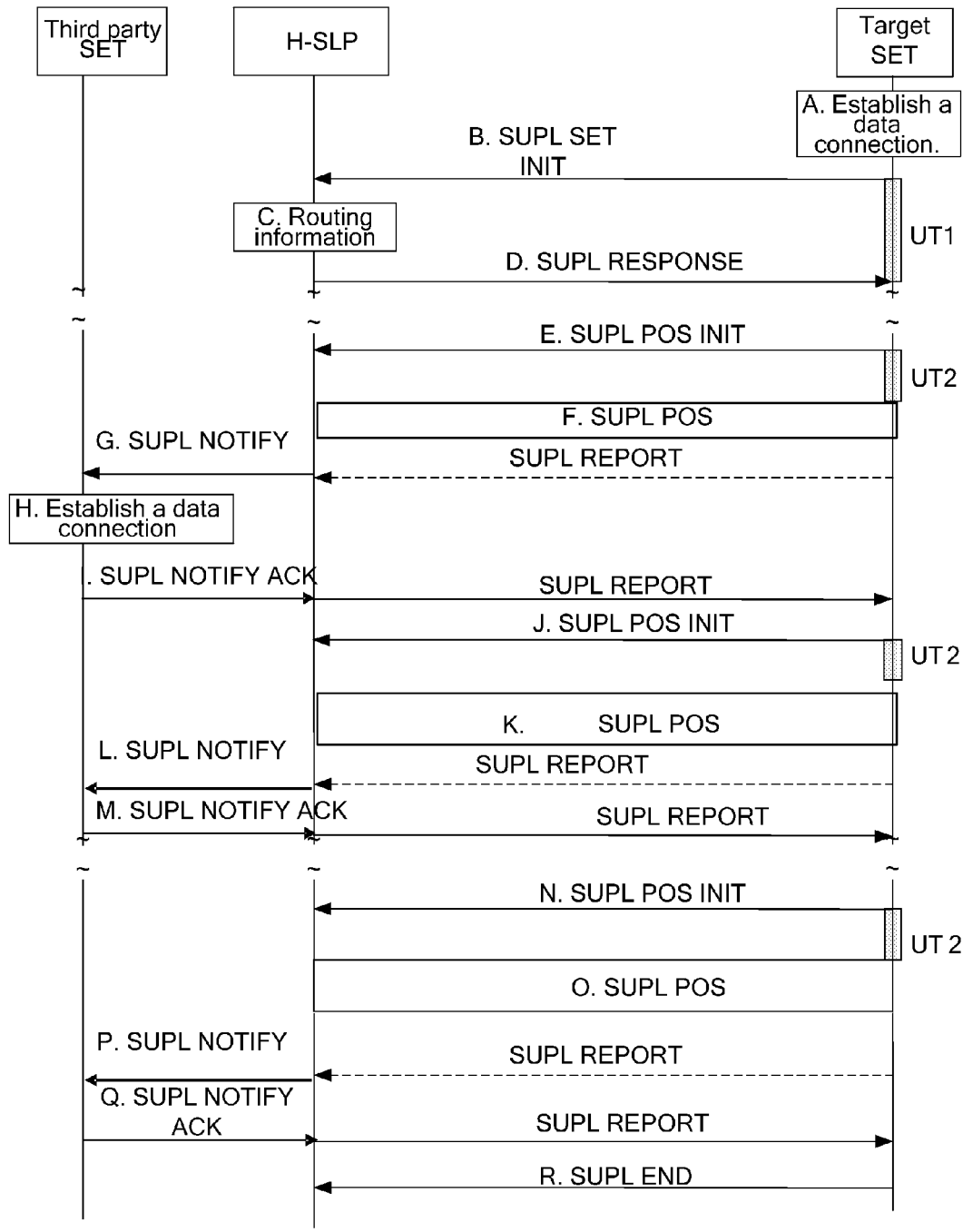
FIG. 7 shows a SET-initiated triggered location procedure in which a trigger is arranged in the SET according to an embodiment of a triggered location method in the present invention.

FIG. 7 shows a SET-initiated triggered location procedure in one embodiment of the triggered location method in the present invention, with the trigger arranged in the SET.

The location procedure includes an initial stage (A, B, C, D) and a location stage (E, F, G, H, I, J, K, L, M, N, O, P, Q, R). In the initial stage, the server and the SET negotiate with each other for relevant location parameters, and then enter the location stage. In the location stage, the location session is performed repeatedly, so as to obtain the location result. For periodical location, the location result of each locating is reported to the specified third party. At the end of the last locating, the entire location procedure is terminated. For area event triggered location, when the specified target area event occurs, the event and the location result are reported to the third party, and that procedure may be repeated several times.

A. The SUPL agent on the target SET receives a location request initiated from an application running on the SET. If the target SET has not been attached to the packet data network, the SUPL agent attaches itself to the packet data network, or, the target SET establishes a CS data connection.

B. The SUPL agent in the target SET uses a default H-SLP address assigned in the home location network to establish a secure IP connection with the H-SLP, and then sends a SUPL SET INIT message to start the location session with the H-SLP. The SUPL SET INIT message contains session-id, third party SET ID, SET capabilities and location ID, MO (mobile SET initiating) mode, response mode, and some parameters for triggered location. The SET capabilities contain the supported location methods (e.g., SET-Assisted A-GPS, SET-Based A-GPS) and corresponding location protocols (e.g., RRLP, RRC, TIA-801). The H-SLP determines the location method to be used according to the location methods supported by the target SET in the SUPL SET INIT message. If a location method is specified, the H-SLP uses the supported location protocol (e.g., RRLP, RRC, TIA-801) in the SUPL SET INIT message.

C. The H-SLP detects the target SET is not in a SUPL roaming state currently.

D. The H-SLP returns a SUPL RESPONSE message to the target SET. The SUPL RESPONSE message contains the location method parameter. When the target SET receives the SUPL RESPONSE message from the H-SLP, the initial stage of location is completed.

E. The target SET sends a SUPL POS INIT message to the H-SLP, according to the start time for periodical location as specified in the triggered location task. The message at least contains session-id, SET capabilities, and location ID. The SET capabilities contain the supported location method (e.g., SET-Assisted A-GPS, SET-Based A-GPS) and the related location protocol (e.g., RRLP, RRC, or TIA-801). The target SET may provide network measurement report (NMR) parameters related to the currently used radio technique (e.g. for a GSM network, there are TA and RXLEV parameters). If the target SET can calculate its location by itself, it may provide its location information. The target SET may include the parameters for the first SUPL POS message in the SUPL POS NIT message and set the assistant data parameters for the request in the message.

F. The target SET exchanges some location messages with the H-SLP continuously. The H-SLP calculates the estimated location from the received location measurement information (SET-Assisted), or the target SET calculates the estimated location from the assistant data provided by the H-SLP.

G. According to the third party SET ID contained in the SUPL SET INIT message or the third party SET ID predefined in the private setting of the target SET, if the location request is an ordinary periodical location request, the H-SLP sends a SUPL POS Notify message to the third party SET to notify that the third party SET is to be notified of a location result of the target SET. If the location request is an area event triggered location request and the area event triggering condition is met, the H-SLP notifies the third party SET in the SUPL POS Notify message that the area event triggering condition is met. The SUPL POS Notify message may be carried in WAP PUSH or SMS. For the purpose of security, the hash of the message may be calculated and stored before the SUPL POS Notify message is sent. If there are multiple third party SETs, the H-SLP sends the notification message to all of the third party SETs. If the location request is an area event triggered location request and the area event triggering condition is not met, the flow will jump to step J.

H. When receiving the SUPL POS Notify message, the third party SET may attach itself to the packet data network (if it has not been attached to the packet data network yet), or, it may establish a CS data connection. If the SUPL POS Notify message carries Key Id (key value) and Media Access Control (MAC) address and the third party SET supports those parameters, those parameters may be used to determine whether the SUPL POS Notify message is authentic.

I. The third party SET returns an SUPL POS Notify Ack message to the H-SLP to indicate the location result notification has been received successfully. Then, the third party SET releases relevant resources. If having not received the SUPL POS Notify Ack message, the H-SLP deems that the third party SET hasn't received the location result notification and then may attempt to resend the SUPL POS Notify message. If the H-SLP fails to send the message, it may preserve the location report information for a certain period of time and wait for the third party SET to request for the location information actively. If receiving the acknowledge notification from the third party SET, the H-SLP sends a SUPL REPORT message to the target SET, to notify that the third party SET has received the location information, and ends the location process. If the location request is an area event triggered location request and the area event triggering condition is met, the flow will jump to step R. Then, the H-SLP and the target SET may release the IP connection.

J. When the start time for location for the second time is reached, the target SET sends a SUPL POS INIT message to the H-SLP. The information contained in the message is identical to the information in the message in step E, and therefore will not be detailed further here.

K. The target SET exchanges some location messages with the H-SLP continuously. The H-SLP calculates the estimated location from the received location measurement information, or the target SET calculates the estimated location from the assistant data provided by the H-SLP.

L. According to the third party SET ID contained in the SUPL POS INIT message or the third party SET ID predefined in the private setting of the target SET, if the location request is an ordinary periodical location request, the H-SLP sends a SUPL POS Notify message to the third party SET to notify that the third party SET is to be notified of a location result of the target SET. If the location request is an area event triggered location request and the area event triggering condition is met, the H-SLP notifies the third party SET that the area event triggering condition is met in the SUPL POS Notify message. The SUPL POS Notify message may be carried in WAP PUSH or SMS. For the purpose of security, the hash of the message may be calculated and stored before the SUPL POS Notify message is sent. If there are multiple third party SETs, the H-SLP sends the notification message to all of the third party SETs. If the location request is an area event triggered location request and the area event triggering condition is not met, the flow will jump to step N.

M. When the third party SET receives the SUPL POS Notify message, it may attach itself to the packet data network (if it has not been attached to the packet data network yet), or, it may establish a CS data connection. If the SUPL POS Notify message carries Key Id and MAC address and the third party SET supports those parameters, those parameters may be used to determine whether the SUPL POS Notify message is authentic. The third party SET returns a SUPL POS Notify Ack message to the H-SLP to indicate the location result notification has been received successfully. Then, the third party SET may release relevant resources. If the H-SLP doesn't receive the SUPL POS Notify Ack message, it deems that the third party SET hasn't received the location result notification and then may attempt to resend the SUPL POS Notify message. If the H-SLP fails to send the message, it may preserve the location report information for a certain period of time and wait for the third party SET to request for the location information actively. If receiving the acknowledge notification from the third party SET, the H-SLP sends an SUPL REPORT message to the target SET to notify that the third party SET has received the location information, and ends the location process. If the location request is an area event triggered location request and the area event triggering condition is met, the flow will jump to step R. Then, the H-SLP and the target SET may release the IP connection.

Next, the steps J, K, L, and M are repeated.

N. When the start time for location for the last time is reached, the target SET sends a SUPL POS INIT message to the H-SLP. The information contained in the message is identical to the information in the message in step E, and therefore will not be detailed further here.

O. The target SET exchanges some location messages with the H-SLP continuously. The H-SLP calculates the estimated location from the received location measurement result (SET-Assisted), or the target SET calculates the estimated location (SET-Based) from the assistant data provided by the H-SLP.

P. According to the third party SET ID contained in the SUPL POS INIT message or the third party SET ID predefined in the private setting of the target SET, if the location request is an ordinary periodical location request, the H-SLP sends a SUPL POS Notify message to the third party SET to notify that the third party SET is to be notified of a location result of the target SET. If the location request is an area event triggered location request and the area event triggering condition is met, the H-SLP notifies the third party SET that the area event triggering condition is met in the SUPL POS Notify message. The SUPL POS Notify message may be carried via WAP PUSH or SMS. For the purpose of security, the hash of the message may be calculated and stored before the SUPL POS Notify message is sent. If there are multiple third party SETs, the H-SLP sends the notification message to all of the third party SETs.

Q. When receiving the SUPL POS Notify message, the third party SET may attach itself to the packet data network (if it has not been attached to the packet data network yet), or, it may establish a CS data connection. If the SUPL POS Notify message carries Key Id and MAC address and the third party SET supports those parameters, those parameters may be used to determine whether the SUPL POS Notify message is authentic. The third party SET returns a SUPL POS Notify Ack message to the H-SLP to indicate the location result notification has been received successfully. Then, the third party SET may release relevant resources. If having not received the SUPL POS Notify Ack message, the H-SLP deems that the third party SET hasn't received the location information and then may attempt to resend the SUPL POS Notify message. If the H-SLP fails to send the message, it may preserve the location report information for a certain period of time and wait for the third party SET to request for the location information actively. If the H-SLP receives the acknowledge notification from the third party SET, it sends a SUPL REPORT message to the target SET to notify that the third party SET has received the location information.

R. The target SET sends a SUPL END message to the H-SLP to notify that there is no new location process and the location session has been completed. Then, the target SET releases all resources related to the session. The H-SLP releases the secure IP connection, and releases all resources related to the session.

The procedure in above embodiment is a SET-initiated procedure in non-roaming and proxy mode. The cases in other modes will be described as follows.

1. Non-Roaming Non-Proxy Mode

In non-proxy mode, the SLP is divided into two parts: SUPL location center (SLC) and SUPL location calculation center (SPC). In the location process, the SLC and the SPC exchange some necessary information with each other, including Key ID, meta-data and location result in the location process. The location session is carried out between the SPC and the target SET; after the location result is calculated, the SPC sends the location result to the third party SET via the SLC.

2. Roaming Proxy Mode, V-SLP Based Location

In this mode, the data related to location calculation is provided by the V-SLP. In the location process, the H-SLP forwards all message data between the target SET and the V-SLP. The V-SLP transmits the location result to the H-SLP, and then the H-SLP transmits the location result to the third party.

3. Roaming Non-Proxy Mode, V-SPC Based Location

It is relatively complex in this mode. The message content between the H-SLP and the V-SLP (including V-SLC and V-SPC) still includes three parts: Key ID, meta-data in the location process, and location result. The V-SLC transmits the location result to the H-SLP, and then the H-SLP transmits the location result to the third party.

4. Roaming Proxy Mode, H-SLP Based Location

In this mode, the data related to location calculation is provided by the H-SLP; therefore, the procedure is relatively simple. The H-SLP obtains the approximate location of the target SET in the current cell from the V-SLP after the H-SLP receives the SUPL SET INIT message. The H-SLP transmits the location result to the third party.

5. Roaming Non-Proxy Mode, H-SPC Based Location

In the location process, the H-SLC and the H-SPC exchanges some necessary information via their internal interface, including Key ID, meta-data in the location process, and location result. The location session is carried out between the H-SPC and the target SET; similar to the above process, the H-SLC and the V-SLP carry out a message interaction with each other to obtain the approximate current location of the target SET. After the location result is calculated, the H-SPC sends the location result to the third party SET via the H-SLC.

According to the embodiment, compared with the triggered location procedure that is initiated by the SET with the trigger at the SET side, in the triggered location procedure that is initiated by the SET with the trigger at the server side, the server initiates the location session with the target SET whenever the start time for location is reached. And the location procedure will be terminated by the H-SLP ultimately. Similarly, the procedure may be modified and extended to cover above non-roaming non-proxy mode, roaming proxy mode, and roaming non-proxy mode.

Figure 8:
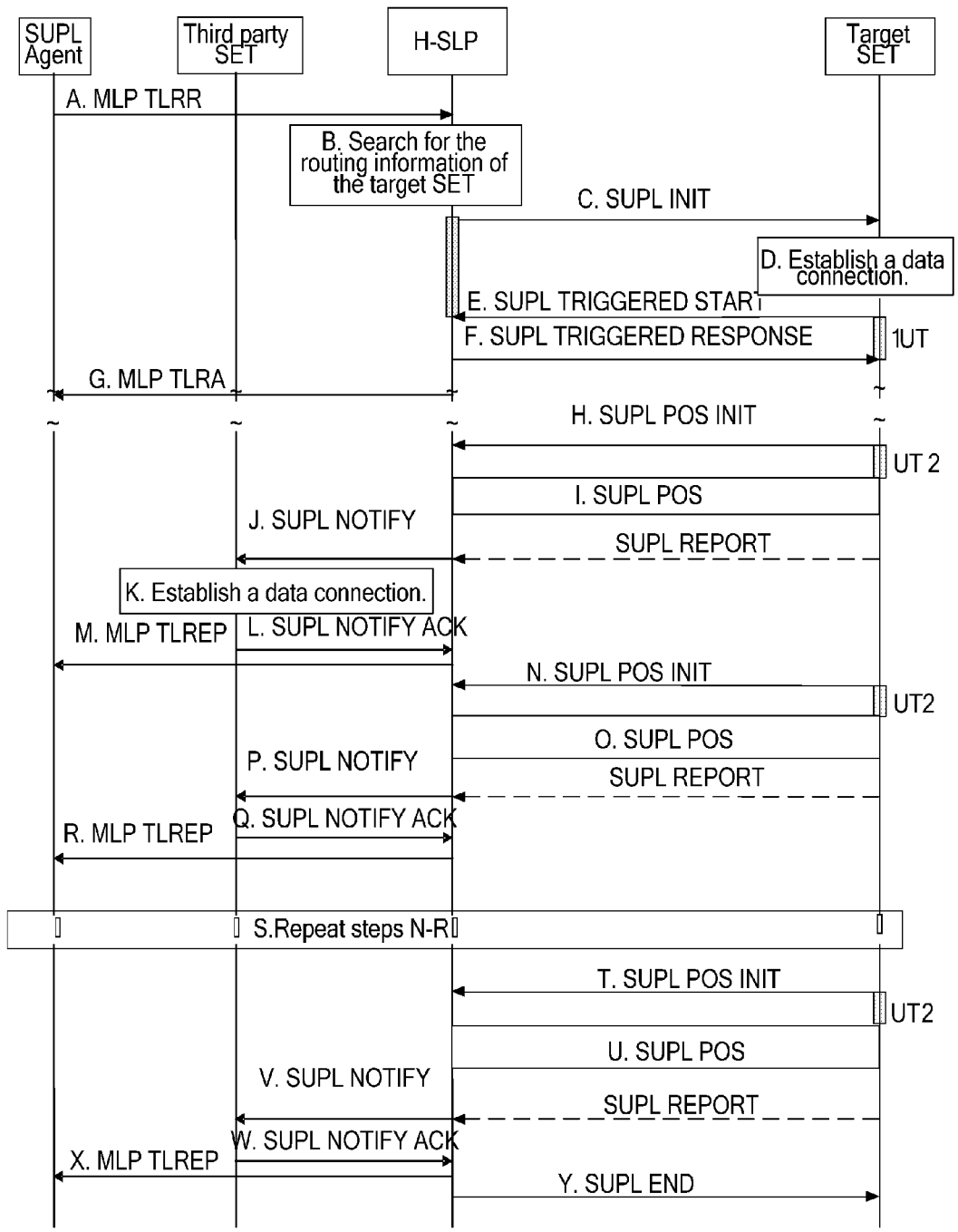
FIG. 8 shows a network-initiated triggered location procedure in which a trigger is arranged in the SET according to an embodiment of a triggered location method in the present invention.

FIG. 8 shows a network-initiated triggered location procedure in one embodiment of the triggered location method in the present invention, with the trigger arranged in the SET as follows:

The entire location procedure may be divided into an initial stage (A, B, C, D, E, F, G) and a location session stage (H, I, J, K, L, M, N, O, P, Q, R, S, T, U, V, W, X, Y).

A. The SUPL agent associated to the H-SLP sends a MLP TLRR message to the H-SLP to initiate a triggered location request, with the third party SET ID carried in the MLP TLRR message. The H-SLP authenticates the SUPL agent, and checks whether the SUPL agent is authorized to use the requested service according to the client-id. The H-SLP authenticates the client-id of the user in the private setting according to the mobile service subscriber ID (ms-id).

B. The H-SLP ascertains that the target SET is not in a roaming state currently. As required, the H-SLP may further ascertain whether the target SET supports SUPL.

C. The H-SLP initializes the location session by means of a SUPL INIT message; the SUPL INIT message may be carried via WAP PUSH or SMS. The SUPL INIT message contains session-id, proxy/non-proxy mode ID, triggered location type, and specified location method. The third party SET to be notified of the location result is specified in the TLRR message. If verification from the target SET is required, the SUPL INIT message contains the third party SET ID. The SUPL INIT may further contain parameter information, such as desired QoP and H-SLP address. If the private setting checking result in step A indicates verification from the target SET or notifying the target SET is required, the H-SLP further includes Notification parameters in the SUPL INIT message. For the purpose of security, the hash of the message may be calculated and stored by the H-SLP before the SUPL INIT message is sent.

D. When receiving the SUPL INIT message, the target SET may attach itself to the packet data network (if it has not been attached to the packet data network yet), or, it may establish a CS data connection. If the SUPL INIT message carries Key Id and MAC and the target SET supports those parameters, the target SET may use those parameters to determine whether the SUPL INIT message is authentic. If verification from the target SET is required, the following actions will be taken after the verification from the target SET is obtained: 1. if the target SET permits, the subsequent steps will be executed; 2. if the target SET doesn't permit, a Reject response is returned, and the H-SLP ends the entire session process.

E. The target SET returns to the H-SLP a SUPL TRIGGER START message in which the SET capabilities, location methods and location protocols supported by the target SET, and approximate location of the target SET is carried.

F. The H-SLP sends a MLP TLRA message to the SUPL agent to indicate that the target SET has accepted the request for sending the triggered location result to the third party.

G. The H-SLP sends to the target SET a SUPL TRIGGERED RESPONSE message in which the location method and the location parameters chosen for the location session is carried. Up to now, the initial stage of the location procedure is completed. The location session may start immediately or after a while, depending on the start time for triggered location. The IP connection between the target SET and the H-SLP may be released by the H-SLP or the target SET when the time counted by the timer is reached.

H. When the start time for periodical triggered location is reached, the target SET sends to the H-SLP a SUPL POS NIT message in which session-id, SET capabilities, and location ID are contained. The Set capabilities contain the supported location method (e.g., SET-Assisted A-GPS, SET-Based A-GPS) and the related location protocol (e.g., RRLP, RRC, or TIA-801). The target SET may provide network measurement report (NMR) parameters related to the currently used radio technique (e.g., for a GSM network, there are TA and RXLEV parameters). If the target SET may calculate its location by itself, it may provide its own location information. The target SET may include the parameters for the first SUPL POS message in the SUPL POS INIT message and set the assistant data parameters for the request in the message.

I. The target SET exchanges some location messages with the H-SLP continuously. The H-SLP calculates the estimated location from the received location measurement information, or the target SET calculates the estimated location with the assistant data provided by the H-SLP.

J. According to the third party SET ID contained in the SUPL INIT message, if the location request is an ordinary periodical location request, the H-SLP sends a SUPL POS Notify message to the third party SET to notify that the third party SET is to be notified of a location result of the target SET; if the location request is an area event triggered location request and the triggering condition is met, the H-SLP notifies the third party SET that the area event triggering condition is met via the SUPL POS Notify message. The SUPL POS Notify message may be carried via WAP PUSH or SMS. For the purpose of security, the hash of the message may be calculated and stored before the SUPL POS Notify message is sent. If there are multiple third party SETs, the H-SLP sends the notification message to all of the third party SETs. If the location request is an area event triggered location request and the area event triggering condition is not met, the flow will jump to step N.

K. When receiving the SUPL POS Notify message, the third party SET may attach itself to the packet data network (if it has not been attached to the packet data network yet), or, it may establish a CS data connection. If the SUPL POS Notify message carries Key Id and MAC address and the third party SET supports those parameters, those parameters may be used to determine whether the SUPL POS Notify message is authentic.

L. The third party SET returns a SUPL POS Notify Ack message to the H-SLP, to indicate the location result notification has been received successfully. Then, the third party SET may release relevant resources. If the H-SLP doesn't receive the SUPL POS Notify Ack message, it deems that the third party SET hasn't received the location information and thereby may attempt to resend the SUPL POS Notify message. If the H-SLP fails to send the message, it may preserve the location report information for a certain period of time and wait for the third party SET to request for the location information actively.

M. If receiving the acknowledge notification from the third party SET, the H-SLP sends an MLP TLREP message to the SUPL agent, to notify that the third party SET has received the location information, and then ends the location process. If the location request is an area event triggered location request and the area event triggering condition is met, the flow will jump to step Y. Then, the H-SLP and the target SET may release the IP connection.

N. When the start time for location for the second time is reached, the target SET sends a SUPL POS INIT message to the H-SLP. The information contained in this message is identical to the information in the SUPL POS INIT message in step H, and therefore will not be detailed further here.

O. The target SET exchanges some location messages with the H-SLP continuously. The H-SLP calculates the estimated location (SET-Assisted) from the received location measurement information, or the target SET calculates the estimated location (SET-Based) from the assistant data provided by the H-SLP.

P. According to the third party SET ID contained in the SUPL INIT message, if the location request is an ordinary periodical location request, the H-SLP sends a SUPL POS Notify message to the third party SET to notify that the third party SET is to be notified of a location result of the target SET; if the location request is an area event triggered location request and the triggering condition is met, the H-SLP notifies the third party SET that the area event triggering condition is met via the SUPL POS Notify message. The SUPL POS Notify message may be carried via WAP PUSH or SMS. For the purpose of security, the hash of the message may be calculated and stored before the SUPL POS Notify message is sent. If there are multiple third party SETs, the H-SLP sends the notification message to all of the third party SETs. If the location request is an area event triggered location request and the area event triggering condition is not met, the flow will jump to step S.

Q. When the third party SET receives the SUPL POS Notify message, it may attach itself to the packet data network (if it has not been attached to the packet data network yet), or, it may establish a CS data connection. If the SUPL POS Notify message carries Key Id and MAC address and the third party SET supports those parameters, those parameters may be used to determine whether the SUPL POS Notify message is authentic. The third party SET returns a SUPL POS Notify Ack message to the H-SLP to indicate the location result notification has been received successfully. Then, the third party SET may release relevant resources. If the H-SLP doesn't receive the SUPL POS Notify Ack message, it deems that the third party SET hasn't received the location information and thereby may attempt to resend the SUPL POS Notify message. If the H-SLP fails to send the message, it may preserve the location report information for a certain period of time and wait for the third party SET to request for the location information actively.

R. If receiving the acknowledge notification from the third party SET, the H-SLP sends a MLP TLREP message to the SUPL agent, to notify that the third party SET has received the location information, and then terminates the location process. If the location request is an area event triggered location request and the area event triggering condition is met, the flow will jump to step Y. Then, the H-SLP and the target SET may release the IP connection.

S. Steps N-R are repeated.

T. When the start time for location for the last time is reached, the target SET sends a SUPL POS INIT message to the H-SLP. The information contained in the message is identical to the information in the SUPL POS NIT message in step H, and therefore will not be detailed further here.

U. The target SET exchanges some location messages with the H-SLP continuously. The H-SLP calculates the estimated location (SET-Based) from the received location measurement information.

V. According to the third party SET ID contained in the SUPL INIT message, if the location request is an ordinary periodical location request, the H-SLP sends a SUPL POS Notify message to the third party SET to notify that the third party SET is to be notified of a location result of the target SET; if the location request is an area event triggered location request and the triggering condition is met, the H-SLP sends an SUPL POS Notify to the third party SET to notice that the area event triggering condition is met. The SUPL POS Notify message may be carried via WAP PUSH or SMS. For the purpose of security, the hash of the message may be calculated and stored before the SUPL POS Notify message is sent. If there are multiple third party SETs, the H-SLP sends the notification message to all of the third party SETs.

W. When the third party SET receives the SUPL POS Notify message, it may attach itself to the packet data network (if it has not been attached to the packet data network yet), or, it may establish a CS data connection. If the SUPL POS Notify message carries Key Id and MAC address and the third party SET supports those parameters, those parameters may be used to determine whether the SUPL POS Notify message is authentic. The third party SET returns a SUPL POS Notify Ack message to the H-SLP to indicate the location result notification has been received successfully. Then, the third party SET may release relevant resources. If the H-SLP doesn't receive the SUPL POS Notify Ack message, it deems that the third party SET hasn't received the location information and thereby may attempt to resend the SUPL POS Notify message. If the H-SLP fails to send the message, it may preserve the location report information for a certain period of time and wait for the third party SET to request for the location information actively.

X. If receiving the acknowledge notification from the third party SET, the H-SLP sends a MLP TLREP message to the SUPL agent, to notify that the third party SET has received the location information, and then terminates the location process.

Y. The H-SLP sends a SUPL END message to the target SET, to notify that the entire location session is completed. Then, the H-SLP and the target SET release the IP connection, respectively.

Similarly, this procedure may be modified and extended to cover above non-roaming non-proxy mode, roaming proxy mode, and roaming non-proxy mode, etc.

In the embodiment of the present invention, compared to the triggered location procedure that is initiated by the network with the trigger at the SET side, the difference of the triggered location procedure that is initiated by the network with the trigger at the server side lies in: whenever the start time for location is reached, the H-SLP initiates the location session with the target SET. The location procedure is terminated by the H-SLP ultimately. Similarly, the procedure may be modified and extended to cover above non-roaming non-proxy mode, roaming proxy mode, and roaming non-proxy mode, etc.

The procedure shown in FIG. 7 and FIG. 8 illustrates a message interaction procedure in the case that the third party SET and the target SET are under the same SLP. If the third party SET and the target SET are under different SLPs, the H-SLP for the target SET transmits the location information to the H-SLP for the third party SET; the two SLPs interact with each other in Roaming Location Protocol (RLP). The messages involved in the interaction include: RLP SRLIR (RLP Standard Roaming Location Immediate Request) message and RLP SRLIA (RLP Standard Roaming Location Immediate Acknowledge) message. The H-SLP for the target SET sends a RLP SRLIR message to the H-SLP for the third party SET, with the third party SET ID, target SET ID, and location information of the target SET carried in the message. When the H-SLP for the third party SET receives the message, it may send an SUPL NOTIFY message carried via WAP PUSH or SMS to the third party SET, with the target SET ID and location information of the target SET carried in the SUPL NOTIFY message. If the third party SET has not connected to the packet data network yet, the third party SET returns an SUPL NOTIFY ACK message to its H-SLP when connecting to the packet data network; then, the H-SLP for the third party SET returns an RLP SRLIA message to the H-SLP for the target SET.

Figure 9:
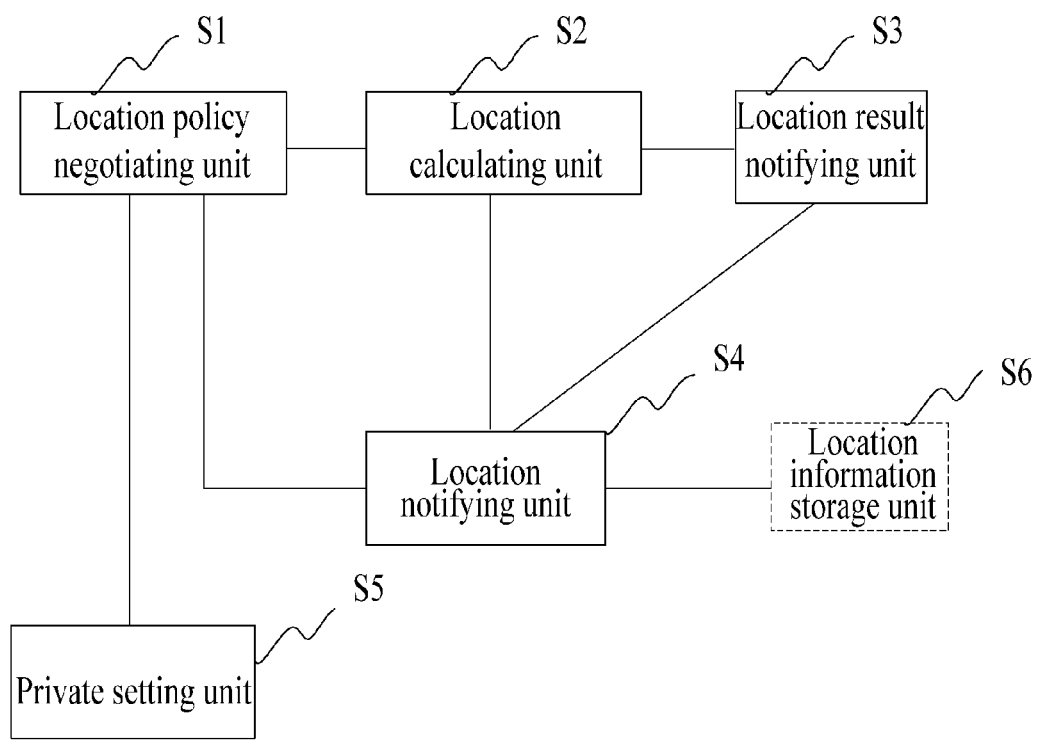
FIG. 9 is a schematic block diagram according to an embodiment of a triggered location device in the present invention.

FIG. 9 shows a schematic block diagram of one embodiment of the triggered location device provided in the present invention.

The device includes a location policy negotiating unit S1, a location calculating unit S2, a location result notifying unit S3, and a location notifying unit S4.

The location calculating unit is designed to calculate the location of the target SET to obtain the location of the target SET. The location notifying unit is designed to send the location information of the target SET to the third party SET periodically or when the area event triggering condition is met.

The location policy negotiating unit is designed to negotiate with the target SET for triggered location in the initial stage of location, including negotiating about sending the location information of the target SET to the third party SET. Accordingly, in an embodiment, the location calculating unit is designed to calculate the location of the target SET according to the trigger location negotiation result from the location policy negotiating unit to obtain the location of the target SET. The location notifying unit is designed to send the location information of the target SET to the third party SET according to the negotiation result on sending the location information of the target SET to the third party SET.

The private setting unit is designed to set the private policy for the location request initiator. Accordingly, in an embodiment, the location notifying unit is designed to analyze the private policy set by the private setting unit. If the private setting unit specifies to notify the third party SET of the location information of the target SET, the location information of the target SET is sent to the third party SET.

In an embodiment, the location policy negotiating unit or private setting unit is designed to make a setting to instruct the location notifying unit to notify the third party SET of the location information of the target SET. Specifically, the location policy negotiating unit is designed to make a setting to instruct the location notifying unit to notify the third party SET of the location information of the target SET, if the SUPL POS INIT message sent from the target SET to the H-SLP specifies to notify the third party SET or the MLP TLRR message specifies to notify the third party SET. In that case, the location notifying unit is designed to:

a. send the location information of the target SET that carries the target SET ID, location information of the target SET, and/or location information of the target SET where the target SET meets the area event triggering condition to the third party SET periodically or only when the area event triggering condition is met; or b. send the location information of the target SET periodically to the third party SET via the H-SLP for the third party SET.

The location result notifying unit is designed to notify the location initiator of the location of the target SET that is obtained by the location calculating unit. The location information storage unit is designed to store the location information of the target SET, and, when receiving a location information request, send the location information of the target SET to the third party SET from the location notifying unit.

In the operation process:

Before the periodical location procedure starts, the location policy negotiating unit S1 makes a setting to instruct the location notifying unit S4 to notify the third party SET of the location information of the target SET.

In the initial stage of the periodical location process, the location policy negotiating unit S1 negotiates the location method and usage parameters with the target SET, thus accomplishes the triggered location negotiation process.

In a network-initiated periodical location process, the location policy negotiating unit S1 sends a SUPL NIT message to the target SET, to notify a triggered location procedure is carried out. If the third party SET is specified in the MLP TLRR message sent to the H-SLP from the SUPL agent associated with the H-SLP, and it is also specified that verification from the target SET is required, the SUPL INIT message sent from the location policy negotiating unit S1 to the target SET carries the third party SET ID specified in the MLP TLRR message; the target SET responds with a SUPL TRIGGERED START message; then, the location policy negotiating unit S1 returns to the target SET a SUPL TRIGGERED RESPONSE message for acknowledge, and sends a location acknowledge message to the SUPL agent at the same time. In that process, the negotiation for some parameters (e.g., location method) is completed; then, the subsequent location procedure is executed.

In a SET-initiated periodical location process, the MLS application in the target SET initiates a location procedure for itself. The target SET sends a SUPL SET INIT message to the location policy negotiating unit S1, with the specified third party SET ID carried in the message; then, the location policy negotiating unit S1 returns to the target SET a SUPL TRIGGERED RESPONSE message for acknowledge. In that process, the negotiation for some parameters is completed; then, the subsequent location procedure is executed.

After the triggered location negotiation procedure is completed, when the start time for location is reached, the location calculating unit S2 calculates the location of the target SET with the location method negotiated by the location policy negotiating unit S1, so as to obtain the location of the target SET. Then, the location result notifying unit S3 sends the location result to the SUPL agent. For ordinary periodical location, the location information is sent to the location initiator each time when the location of the target SET is obtained; for area event trigger location, the location result notifying unit S3 sends a location report to the SUPL agent when the area event triggering condition is met; the report may contain the location information of the target SET as requested by the SUPL agent. While the location result notifying unit S3 sends the location information or the location service to the SUPL agent, the location notifying unit S4 sends the location information of the target SET to the third party SET periodically or only when the area event triggering condition is met. The third party SET ID is obtained by the location policy negotiating unit S1 in the initial stage of the location session.

In order to allow flexible and convenient location notification control, a private setting unit S5 may be arranged in the device, as shown in FIG. 9. The private setting unit S5 is designed to make a setting to instruct the location notifying unit S4 to notify the third party SET of the location information of the target SET, and specify whether verification from the target SET is required for the third party SET, and, whether to verify only once or verify for many times.

For network-initiated periodical location or area event triggered location, in the initial stage of the location session, the location policy negotiating unit appends appropriate parameters to the SUPL INIT message sent to the target SET, according to the private setting in the private setting unit S5. For example, if it is specified in the private setting of the target SET that the target SET needs to verify the requester or the third party SET, in the initial of the location session or whenever the location procedure starts, the location policy negotiating unit S1 sends to the target SET a message carrying parameters of notification and/or verification. The target SET includes the parameters of notification and/or verification in the SUPL TRIGGERED START message sent to the location policy negotiating unit S1; if the target SET accepts the request for sending the location information to the third-party, the location policy negotiating unit S1 sends a SUPL TRIGGERED RESPONSE message to the target SET; if the target SET rejects the request for sending the location information to the third party, the location information or triggered event is not sent to the third party when the location procedure is terminated or the area event triggering event is triggered.

In order to ensure the location information can be received accurately, a location information storage unit S6 may be arranged in the device, as shown in FIG. 9. The location information storage unit S6 is designed to store the location information of the target SET.

When the third party SET receives the location information, it returns an acknowledge message to the location notifying unit S4. For SET-initiated triggered location, when the location notifying unit S4 receives an acknowledge from the third party SET, it notifies the location result notifying unit S3 to send a SUPL REPORT message to the target SET, to notify the target SET that the third party SET has received the location information, and then the location process terminates; for network-initiated triggered location, when the location notifying unit S4 receives an acknowledge from the third party SET, it notifies the location result notifying unit S3 to send a MLP TLREP message to the SUPL agent, to notify the SUPL agent that the third party SET has received the location information, and then the location process terminates.

In particular, the SUPL NOTIFY message may be carried via SMS or WAP PUSH or over the IP network. For example, the SUPL NOTIFY message may be sent to the third party SET via an EMAIL server.

If the location notifying unit S4 hasn't received any acknowledge message from the third party SET within the predefined time, the location notifying unit S4 may resend the location notification message to the third party SET for predefined times. If the location notifying unit S4 still can't receive any acknowledge notification from the third party SET after sending the location notification message for predefined times, it may preserve the obtained location information of the target SET in the location information storage unit S6. The preservation time and data capacity of the location information to be stored in the location information storage unit S6 may be predefined by the target SET.

In this way, when another SET requests the device for the historical location information of the target SET, the location notifying unit S4 may determine whether it is allowed to provide the historical location information to the another SET according to the private setting of the target SET. If it is allowed, the location notifying unit S4 sends the historical location information of the target SET that is stored in the location information storage unit S6 to the another SET that requests for the information.

In actual applications, the device may be integrated in a server, or, the units of the device may be dispersed in a server and a SET, so as to notify the third party SET of the location information of the target SET in the triggered location process.

While the present invention has been illustrated and described with reference to some preferred embodiments, the present invention is not limited to these. Those skilled in the art should recognize that various variations and modifications can be made without departing from the spirit and scope of the present invention as defined by the accompanying claims.

What is claimed is:

1. A triggered location method, comprising:
pre-specifying information of a third party that requires location notification of a target SET;
sending, by a location server, location information of the target SET to the third party, wherein the location information of the target SET is sent periodically after the location information of the target SET is obtained according to periodically triggered calculation of a location of the target SET, or when an area event triggering condition is met,
wherein the pre-specifying information of the third party that requires the location notification of the target SET further comprises:
for a SET-initiated triggered location, specifying the third party in a trigged location start message sent from the target SET to the location server or specifying the third party in private setting of the target SET; or
for a network-initiated triggered location, specifying the third party in a Mobile Location Protocol Triggering Location Report Request (MLP TLRR) message sent from a Security User Plane Location (SUPL) agent to the location server, and making, by the location server, the setting to instruct notifying the third party of the location information via a triggered location start message that carries the information in the MLP TLRR message.

2. The triggered location method according to claim 1, wherein, the private setting of the target SET comprises at least one of the group consisting of:
- whether notification and verification are both required for one of a location requester and the third party to be notified of the location;
- whether to notify and verify once in an initial stage of a triggered location procedure or whenever a location session starts; and
- whether to notify the target SET of the location result that is sent to the third party.

3. The triggered location method according to claim 2, further comprising:
- for a network-initiated periodical location or an area event triggered location, sending a message carrying parameters of one of the notification and the verification to the target SET, in the initial stage of the location or whenever the location starts, if the private setting of the target SET specifies the verification from the target SET is required for one of the requester and the third party;
- receiving an SUPL triggered start message, in which the parameters indicate whether to permit one of the notification and the verification is carried, from the target SET;
- sending an SUPL triggered response message to the target SET, if the target SET permits one of the notification and the verification;
- not sending the location information or the triggered event to the third party when the location procedure is terminated or the area event is triggered, if the target SET verifies to reject the request for sending the location information to the third party.

4. The triggered location method according to claim 1, wherein, the process of sending the location information to the third party further comprises:
- sending, by the location server, to the third party a location notification message and carrying in the location notification message a target SET ID, and the location information of the target SET.

5. The triggered location method according to claim 4, wherein, the location notification message is carried via one of a Short Messaging Service, (SMS), a Wireless Access Protocol Push (WAP PUSH), and an Internet Protocol network (IP).

6. The triggered location method according to claim 4, wherein, if multiple third parties requiring the location notification are specified, the location server sends the location notification message to each of the third party in sequence.

7. The triggered location method according to claim 4, further comprising:
- returning an acknowledge notification from the third party to the location server, when the third party receives the location notification message sent from the location server;
- for the SET-initiated triggered location, sending an SUPL report message from the location server to the target SET, to notify the target SET that the third party has received the location information, and then terminating the location process, when the location server receives the acknowledge notification from the third party;
- for the network-initiated triggered location, sending an Mobile Location Protocol Triggering Location Report (MLP TLREP) message from the location server to the SUPL agent, to notify the SUPL agent that the third party has received the location notification message, and then terminating the location process, when the location server receives the acknowledge notification from the third party.

8. The triggered location method according to claim 7, further comprising:
- resending the location notification message for predefined times, by the location server, to the third party, if the location server cannot receive the acknowledge notification from the third party within a first predefined time; and
- returning, by the location server, a failure notification message to the target SET and preserving the obtained location information of the target SET locally or in the target SET, if the location server still cannot receive any acknowledge notification from the third party after the location server resends the location notification message to the third party for the predefined times.

9. The triggered location method according to claim 8, further comprising:
- if any other SET requests historical location information of the target SET from the home location server for the target SET, determining, by the home location server for the target SET, whether it is allowed to provide the historical location information of the target SET to the requesting SET, and, if allowed, sending the historical location information of the target SET that is stored locally or in the target SET to the requesting SET, by the home location server.

10. The triggered location method according to claim 1, wherein, the step of sending the location information to the third party further comprises:
- sending, by the location server, the location information of the target SET to the third party over the IP network.

11. The triggered location method according to claim 1, wherein, the location server comprises the home location server for the target SET or the visit location server if the target SET is in a roaming state.

12. The triggered location method according to claim 1, wherein the step of sending the location information to the third party further comprises:
- sending, by the home location server for the target SET, the location information of the target SET to the home location server for the third party; and
- sending, by the home location server for the third party, the location information to the third party, if the third party and the target SET are not under the same location server.

13. A triggered location device, comprising:
- a location calculating unit, configured to calculate location information of a target SET to obtain a location of the target SET;
- a location notifying unit, configured to send the location information of the target SET to a third party periodically according to periodically triggered calculation of the location of the target SET, or configured to send the location information to the third party when an area event triggering condition is met; and
- a location policy negotiating unit, configured to make a setting to instruct the location notifying unit to notify the third party of the location information of the target SET;
- wherein the third party is specified in at least one of the following: a triggered location start message sent from the target SET to a location server, a private setting of the target SET, and a mobile location protocol triggering location report request message.

* * * * *